United States Patent
Liu

(10) Patent No.: US 12,517,694 B2
(45) Date of Patent: Jan. 6, 2026

(54) DATA SHARING METHOD, COMPUTER DEVICE AND STORAGE MEDIUM

(71) Applicant: BOE Technology Group Co., Ltd., Beijing (CN)

(72) Inventor: Pengyu Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 250 days.

(21) Appl. No.: 18/271,853

(22) PCT Filed: Feb. 25, 2021

(86) PCT No.: PCT/CN2021/077958
§ 371 (c)(1),
(2) Date: Jul. 12, 2023

(87) PCT Pub. No.: WO2022/178777
PCT Pub. Date: Sep. 1, 2022

(65) Prior Publication Data
US 2024/0311070 A1    Sep. 19, 2024

(51) Int. Cl.
*G06F 3/14* (2006.01)
*H04L 67/50* (2022.01)
*H04L 67/54* (2022.01)

(52) U.S. Cl.
CPC .......... *G06F 3/1462* (2013.01); *H04L 67/535* (2022.05); *H04L 67/54* (2022.05)

(58) Field of Classification Search
CPC ..... G06F 3/1462; H04L 67/535; H04L 67/54; H04L 67/1095; G09B 5/10
See application file for complete search history.

(56) References Cited

U.S. PATENT DOCUMENTS

| | | | |
|---|---|---|---|
| 9,575,712 B2 | 2/2017 | Farouki | |
| 10,768,885 B1* | 9/2020 | Fieldman | H04L 65/403 |
| 11,055,055 B1* | 7/2021 | Fieldman | G06T 11/60 |
| 11,281,423 B1* | 3/2022 | Fieldman | G06F 9/451 |
| 2006/0059253 A1* | 3/2006 | Goodman | G06Q 10/10 |
| | | | 709/223 |

(Continued)

FOREIGN PATENT DOCUMENTS

| | | |
|---|---|---|
| CN | 105405325 A | 3/2016 |
| CN | 105681920 A | 6/2016 |

(Continued)

OTHER PUBLICATIONS

International Search Report and Written Opinion issued Dec. 3, 2023 in corresponding Chinese Patent Application No. PCT/CN2021/077958, 13 pages.

(Continued)

*Primary Examiner* — Dmitriy Bolotin
(74) *Attorney, Agent, or Firm* — XSENSUS LLP

(57) ABSTRACT

A data sharing method, which is used for an electronic whiteboard, and includes: controlling the electronic whiteboard to start a web service and a synchronization server in response to the electronic whiteboard starting a target application; receiving a user input to determine a user operation, and caching user operation information; and transmitting, via the synchronization server, the user operation information to a mobile terminal that accesses the web service.

18 Claims, 6 Drawing Sheets

(56) References Cited

U.S. PATENT DOCUMENTS

| | | | |
|---|---|---|---|
| 2013/0110547 A1* | 5/2013 | Englund | G16H 10/60 |
| | | | 705/3 |
| 2014/0149880 A1 | 5/2014 | Farouki | |
| 2015/0195320 A1 | 7/2015 | Avraham | |
| 2016/0170571 A1* | 6/2016 | Hoshino | H04L 12/1827 |
| | | | 348/14.03 |
| 2016/0210457 A1* | 7/2016 | Cleeton | G06F 21/575 |
| 2017/0115855 A1 | 4/2017 | Farouki | |
| 2020/0177406 A1* | 6/2020 | Araki | H04L 12/1822 |
| 2020/0382567 A1* | 12/2020 | Araki | H04M 3/567 |

FOREIGN PATENT DOCUMENTS

| | | |
|---|---|---|
| CN | 105892765 A | 8/2016 |
| CN | 104517102 B | 9/2017 |
| CN | 104333574 B | 4/2018 |
| CN | 108319619 A | 7/2018 |
| CN | 109032390 A | 12/2018 |
| CN | 109035089 A | 12/2018 |
| CN | 109166382 A | 1/2019 |
| CN | 109285401 A | 1/2019 |
| CN | 109324745 A | 2/2019 |
| CN | 109803162 A | 5/2019 |
| CN | 110110263 A | 8/2019 |
| CN | 110392063 A | 10/2019 |
| CN | 110597472 A | 12/2019 |
| CN | 110989903 A | 4/2020 |
| CN | 111262920 A | 6/2020 |
| CN | 111459438 A | 7/2020 |
| CN | 112316424 A | 2/2021 |
| CN | 114968241 A | 8/2022 |
| CN | 115630121 A | 1/2023 |
| EP | 2926235 B1 | 8/2021 |
| WO | 2014085726 A2 | 6/2014 |
| WO | 2014085726 A3 | 11/2014 |

OTHER PUBLICATIONS

Chinese Office Action issued Aug. 11, 2023 in Chinese Patent Application No. 202180000320.5, 7 pages.

Bin Xiao, "Based on the WebSocket board design of teaching", Docin, Chapters 2-5, Jun. 22, 2017, http://www.docin.com/p-1956560885.html.

Yu Fu, "Design and implementation of whiteboard implementation mechanism based on WebRTC", China Master's Theses Full-text Database, Information Science and Technology Series, No. 08, 2015, entire document, Dec. 30, 2014.

Mailles-Viard Metz, S. et al., "The shared online whiteboard: An assistance tool to synchronous collaborative design", European Review of Applied Psychology, vol. 65 No. 5, pp. 253-265, Sep. 2, 2015.

* cited by examiner

DATA SHARING METHOD, COMPUTER DEVICE AND STORAGE MEDIUM

CROSS-REFERENCE TO RELATED APPLICATION

This application is a US national stage of international application No. PCT/CN2021/077958, filed on Feb. 25, 2021, the disclosures of which are incorporated herein by reference in its entirety.

TECHNICAL FIELD

The present disclosure relates to the field of data transmission, and more particularly, relates to a data sharing method, an electronic whiteboard, a mobile terminal, a computer device and a storage medium.

BACKGROUND OF THE INVENTION

An electronic whiteboard can achieve the functions of writing, drawing, courseware demonstration, annotation, etc., and hence can be extensively applied to interactive systems such as education and teleconference systems. In the prior art, some electronic whiteboards can only be used for local writing but cannot realize data sharing. However, an interactive electronic whiteboard is usually used for acquiring data information on the electronic whiteboard in real time to realize interactive sharing of information with other electronic whiteboards, and is used for carrying out application service business such as Internet teaching and network conferences. When in use, the interactive electronic whiteboard communicates with other electronic whiteboards as below: the interactive electronic whiteboard as a lecturer end uploads data to a network server, and the network server saves the data, and then informs other interactive electronic whiteboards as listener ends to update the data, so as to achieve the function of data sharing. However, the existing electronic whiteboards are narrow in range of application and not flexible enough.

SUMMARY OF THE INVENTION

According to embodiments of the present disclosure, a data sharing method, an electronic whiteboard, a mobile terminal, a computer device and a storage medium are provided.

According to some embodiments of the present disclosure, a data sharing method is used for an electronic whiteboard. The data sharing method includes: controlling the electronic whiteboard to start a web service and a synchronization server in response to the electronic whiteboard starting a target application; receiving a user input to determine a user operation and caching user operation information; and transmitting, via the synchronization server, the user operation information to a mobile terminal that accesses the web service.

In some embodiments, the data sharing method includes: controlling the electronic whiteboard to display an address of the web service and/or display an identification code generated according to the address of the web service, so that the mobile terminal accesses the web service via the address of the web service and/or the identification code generated according to the address of the web service.

In some embodiments, transmitting, via the synchronization server, the user operation information to the mobile terminal that accesses the web service includes: detecting whether a user is currently accessing the web service; and transmitting, via the synchronization server, the user operation information to a mobile terminal that accesses the web service, if a user is accessing the web service.

In some embodiments, the user input includes a writing input, receiving the user input to determine the user operation, and caching the user operation information includes: receiving touch points of the writing input, generating a writing track point sequence in real time, and caching the writing track point sequence; and transmitting, via the synchronization server, the user operation information to the mobile terminal that accesses the web service includes: detecting whether the writing input is completed; and transmitting, via the synchronization server, the writing track point sequence to the mobile terminal that accesses the web service, if the writing input is completed.

In some embodiments, detecting whether the writing input is completed includes: detecting an input signal within preset time, and determining that the writing input is completed if no signal is input within the preset time.

In some embodiments, the user input includes an erasing input, receiving the user input to determine the user operation, and caching the user operation information includes: receiving the erasing input to determine the track point sequence to be erased or select a track to be erased, erasing a corresponding track point, and caching an erased track point; and transmitting, via the synchronization server, the user operation information to the mobile terminal that accesses the web service includes: transmitting, via the synchronization server, the erased track point to a mobile terminal that accesses the web service, after the erasing input is completed.

In some embodiments, the user input includes canvas translation, receiving the user input to determine the user operation, and caching the user operation information includes: receiving the canvas translation to modify canvas location information, and caching information of a translated canvas; and transmitting, via the synchronization server, the user operation information to the mobile terminal that accesses the web service includes: transmitting, via the synchronization server, the information of the translated canvas to the mobile terminal that accesses the web service, after the canvas translation is completed.

In some embodiments, the user input includes canvas zooming, receiving the user input to determine the user operation, and caching the user operation information includes: receiving the canvas zooming to modify canvas zooming information, and caching information of a zoomed canvas; and transmitting, via the synchronization server, the user operation information to the mobile terminal that accesses the web service includes: transmitting, via the synchronization server, the information of the zoomed canvas to the mobile terminal that accesses the web service, after the canvas zooming is completed.

In some embodiments, the user input includes background modification, receiving the user input to determine the user operation, and caching the user operation information includes: receiving the background modification to modify canvas background information, and caching modified canvas background information; and transmitting, via the synchronization server, the user operation information to the mobile terminal that accesses the web service includes: transmitting, via the synchronization server, the modified canvas background information to a mobile terminal that accesses the web service, after the background modification is completed.

In some embodiments, the web service is an HTTP web service, and the synchronization server is a local synchronization server of the electronic whiteboard.

According to some embodiments of the present disclosure, a data sharing method is further provided and is used for a mobile terminal. The data sharing method includes: accessing a web service started by an electronic whiteboard to connect to a synchronization server started by the electronic whiteboard; and receiving user operation information of the electronic whiteboard to update a web rendering image corresponding to the electronic whiteboard on an application web of the mobile terminal.

In some embodiments, the mobile terminal accesses the web service via an address of the web service and/or via an identification code generated according to the address of the web service.

In some embodiments, receiving the user operation information of the electronic whiteboard to update the web rendering image corresponding to the electronic whiteboard on the application web of the mobile terminal includes: determining, according to the user operation information, an operation type and operation data of an input made by a user on the electronic whiteboard; and rendering the operation data according to the operation type to acquire the web rendering image.

In some embodiments, receiving the user operation information of the electronic whiteboard to update the web rendering image corresponding to the electronic whiteboard on the application web of the mobile terminal includes: acquiring all user operation information of the electronic whiteboard cached in history from the synchronization server, and performing initial rendering according to the user operation information, in response to starting or refreshing the web.

In some embodiments, receiving the user operation information of the electronic whiteboard to update, on the application web of the mobile terminal, the web rendering image corresponding to the electronic whiteboard on the application web of the mobile terminal includes: receiving writing track sequence points of the electronic whiteboard and generating a writing track on the application web of the mobile terminal to update a web rendering image corresponding to the writing track of the electronic whiteboard.

In some embodiments, receiving the user operation information of the electronic whiteboard to update the web rendering image corresponding to the electronic whiteboard on the application web of the mobile terminal includes: receiving track points of erased by the electronic whiteboard and erasing corresponding track points on the application web of the mobile terminal to update the web rendering image corresponding to the electronic whiteboard from which the corresponding track points are erased.

In some embodiments, receiving the user operation information of the electronic whiteboard to update the web rendering image corresponding to the electronic whiteboard on the application web of the mobile terminal includes: receiving information of a translated canvas of the electronic whiteboard and modifying canvas location information on the application web of the mobile terminal to update a web rendering image corresponding to the translated canvas of the electronic whiteboard.

In some embodiments, receiving the user operation information of the electronic whiteboard to update the web rendering image corresponding to the electronic whiteboard on the application web of the mobile terminal includes: receiving information of a zoomed canvas of the electronic whiteboard and modifying canvas zooming information on the application web of the mobile terminal to update a web rendering image corresponding to the zoomed canvas of the electronic whiteboard.

In some embodiments, receiving the user operation information of the electronic whiteboard to update the web rendering image corresponding to the electronic whiteboard on the application web of the mobile terminal includes: receiving modified canvas background information of the electronic whiteboard and modifying canvas background information on the application web of the mobile terminal to update a web rendering image corresponding to the electronic whiteboard after background modification.

According to some embodiments of the present disclosure, an electronic whiteboard is further provided. The electronic whiteboard includes a starting module, a processing module and a transmitting module, wherein the starting module is configured to control the electronic whiteboard to start a web service and a synchronization server in response to the electronic whiteboard starting a target application; the processing module is configured to receive a user input to determine a user operation, and cache user operation information; and the transmitting module is configured to transmit, via the synchronization server, the user operation information to a mobile terminal that accesses the web service.

According to some embodiments of the present disclosure, a mobile terminal is further provided. The mobile terminal includes an accessing module and a receiving module, wherein the accessing module is configured to access a web service started by an electronic whiteboard to connect to a synchronization server started by the electronic whiteboard; and the receiving module is configured to receive user operation information of the electronic whiteboard to update, on an application web of a mobile terminal, a web rendering image corresponding to the electronic whiteboard.

According to some embodiments of the present disclosure, a computer device is further provided. The computer device includes a processor and a memory, wherein the memory stores a computer program; and the computer program, when executed by the processor, causes the processor to implement the data sharing method according to any one of the above embodiments.

According to some embodiments of the present disclosure, a storage medium is further provided. The storage medium stores a computer program, wherein the computer program, when executed by one or more processors, causes the processor(s) to implement the data sharing method according to any one of the above embodiments.

According to the embodiments of the present disclosure, the data sharing method, the electronic whiteboard, the mobile terminal, the computer device and the storage medium can achieve the function of sharing without using an external server by starting the web service and the synchronization server when the electronic whiteboard starts the target application, and by transmitting the user operation information received by the electronic whiteboard to all the connected mobile terminals, so that the practicability of the whiteboard is improved; moreover, the track effect is shared and displayed via the web service, so that the use is simple; and the ease of deployment and demonstration is improved since neither an additional electronic whiteboard nor a client is required.

Additional aspects and advantages of the embodiments of the present disclosure will be set forth in part in the descriptions below, and in part will become apparent from the descriptions below, or may be learned through practice of the embodiments of the present disclosure.

BRIEF DESCRIPTION OF DRAWINGS

The above and/or additional aspects and advantages of the present disclosure will become apparent and easy to understand from the descriptions of the embodiments with reference to the drawings as below, in which.

DETAILED DESCRIPTION

Embodiments of the present disclosure will be described in detail hereinafter. Examples of the embodiments are shown in the accompanying drawings, throughout which the same or similar reference signs indicate the same or similar elements or elements having the same or similar functions. The embodiments described below with reference to the accompanying drawings are exemplary and are only intended to explain the present disclosure, rather than being construed as a limitation to the present disclosure.

Figure 1:
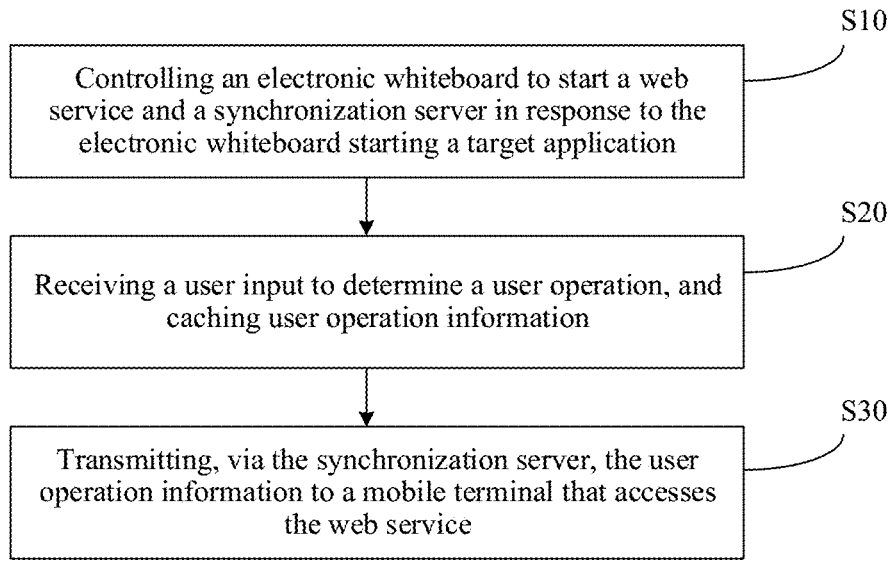
FIG. 1 is a schematic flow chart of a data sharing method according to some embodiments of the present disclosure.
Figure 2:
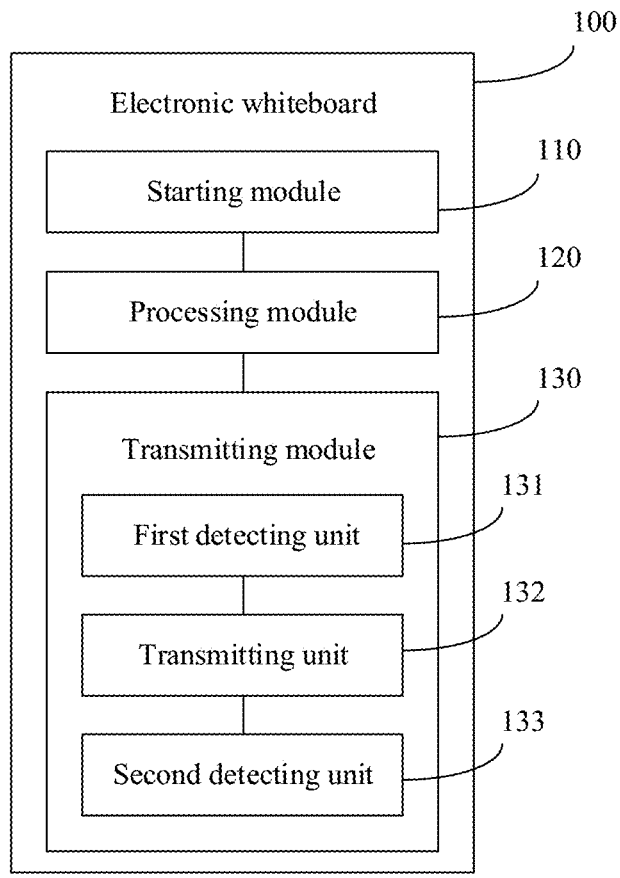
FIG. 2 is a schematic diagram of modules of an electronic whiteboard according to some embodiments of the present disclosure.

Referring to FIGS. 1 and 2, a data sharing method according to some embodiments of the present disclosure is used for an electronic whiteboard 100, so that the electronic whiteboard 100 can achieve the function of sharing, and expand the practicability and application scope of the electronic whiteboard.

In some embodiments, the data sharing method includes the following steps.

In S10, the electronic whiteboard 100 is controlled to start a web service and a synchronization server in response to the electronic whiteboard 100 starting a target application.

In S20, a user input is received to determine a user operation, and user operation information is cached.

In S30, the user operation information is transmitted via the synchronization server to a mobile terminal that accesses the web service.

Specifically, the electronic whiteboard 100 may include a starting module 110, a processing module 120 and a transmitting module 130. The S10 may be implemented by the starting module 110, the S20 may be implemented by the processing module 120, and the S30 may be implemented by the transmitting module 130. That is, the starting module 110 may be configured to start the web service and the synchronization server in response to the electronic whiteboard 100 starting the target application, the processing module 120 may be configured to receive the user input to determine the user operation and cache user operation information, and the transmitting module 130 may be configured to transmit, via the synchronization server, the user operation information to the mobile terminal that accesses the web service.

In the data sharing method according to the embodiments of the present disclosure, the electronic whiteboard 100 can achieve the function of sharing without using an external server by starting the web service and the synchronization server when the target application is started, and by transmitting the user operation information to all the connected mobile terminals, so that the practicability of the whiteboard is improved. Moreover, the track effect is shared and displayed by a web, so that the use is simple; and the convenience of deployment and demonstration is improved since neither an additional electronic whiteboard nor a client is required.

In S20, the electronic whiteboard 100 may receive the user input by monitoring an input signal of an input device (not shown). The input device may be a touchpad, a touch screen, a stylus, a laser pointer, a mouse or a wearable device. The user operation information includes the operation type and the operation data when the user inputs on the electronic whiteboard 100. For example, the operation type may include but is not limited to user operations such as a writing operation, an erasing operation, canvas translation, canvas zooming or background modification, and the operation data may include but is not limited to a writing track point, an erasing track point, canvas location information, canvas zooming information and/or canvas background information.

In some embodiments, via the synchronization server, current user operation information may be transmitted to a mobile terminal that accesses the web service in S30.

If the user does not continue to input after a user operation is determined according to an input of the user, it can be understood that the electronic whiteboard 100 currently keeps the user operation, i.e., the current user operation information refers to the user operation information cached according to the latest input of the user. In the data sharing method according to this embodiment, data sharing means that after the user completes a certain input on the electronic whiteboard 100, a result of the current input may be displayed in time on a mobile terminal that has accessed the web service of the electronic whiteboard 100.

In some embodiments, the electronic whiteboard 100 may also perform rendering according to user input information to display a picture corresponding to the user input on the electronic whiteboard 100. Rendering may graphically draw the received and cached operation data and then provide a more advanced processing control for graphics, texts and images.

It should be noted that when the electronic whiteboard 100 is in use, the user inputs may be received for many times, and a plurality of user operations may be determined and acquired in sequence. After that, the electronic whiteboard 100 sequentially renders and caches the operation types and the corresponding operation data of the plurality of user operations. The rendering of the display frame of the electronic whiteboard 100 may be implemented by a graphics processor (not shown) arranged on the electronic whiteboard 100 or connected to the electronic whiteboard 100. The electronic whiteboard 100 may cache the user operation information by a processor (not shown) and/or a memory (not shown) arranged on the electronic whiteboard 100 or connected to the electronic whiteboard 100.

In some embodiments, the data sharing method includes: controlling the electronic whiteboard 100 to display an address of the web service and/or display an identification code generated according to the address of the web service, so that the mobile terminal may access the web service via the address of the web service and/or the identification code generated according to the address of the web service.

Specifically, the electronic whiteboard 100 includes a display module (not shown). The display module may be configured to control the electronic whiteboard 100 to display an address of the web service and/or display an identification code generated according to the address of the web service, so that the mobile terminal may access the web service via the address of the web service and/or the identification code generated according to the address of the web service.

It can be understood that by displaying the address of the web service on the electronic whiteboard 100, it is convenient for the user to access the web service of the electronic whiteboard 100. Of course, when the electronic whiteboard 100 displays the identification code generated according to the address of the network server, the user can identify the address of the network server by scanning the code, so as to access the web service of the electronic whiteboard 100, which omits the process of manually inputting the address by the user and is beneficial to optimizing the user experience. The identification code may be a pattern such as a barcode and/or a QR code that may carry information by means of images.

In some embodiments, when the mobile terminal accesses the web service of the electronic whiteboard 100 via the identification code, the identification code may be used as an access certificate of the mobile terminal, i.e., after acquiring the identification code, the mobile terminal has a permission to access the web service of the electronic whiteboard 100. Of course, in other embodiments, after acquiring the identification code, the mobile terminal logs in via an identity certificate, for example, a user ID, to acquire the permission to the web service of the electronic whiteboard 100.

The web service may be used as a window for connection between the electronic whiteboard 100 and other mobile terminals. A local area network may be established after the electronic whiteboard 100 starts the web service. The mobile terminal may be connected to the electronic whiteboard 100 via the local area network to access the web service. Of course, the local area network may also be connected to the Internet, and the mobile terminal may also be connected to the electronic whiteboard 100 via the Internet, which is not specifically limited herein.

In some embodiments, the web service is an HTTP web service, and the synchronization server is a local synchronization server of the electronic whiteboard.

In this way, the HTTP web service provides a window for the connection between the electronic whiteboard 100 and other mobile terminals, and the local synchronization server of the electronic whiteboard can achieve the function of sharing without using an external server. The synchronization server may be a WebSocket synchronization server, so that the mobile terminal may establish a long connection with the WebSocket synchronization server after accessing the web service and realize bidirectional communication thereby maintaining data sharing.

Figure 3:
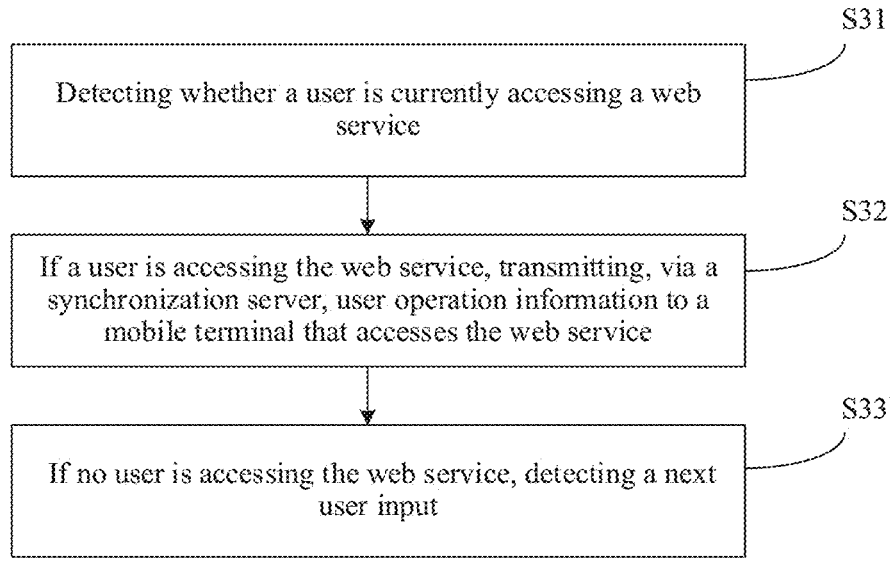
FIG. 3 is another schematic flow chart of a data sharing method according to some embodiments of the present disclosure.

Referring to FIG. 3, in some embodiments, S30 includes the following steps.

In S31, whether a user is currently accessing a web service is detected.

In S32, if a user is accessing the web service, the user operation information is transmitted via the synchronization server to a mobile terminal that accesses the web service.

Specifically, the transmitting module 130 includes a first detecting unit 131 and a transmitting unit 132. S31 may be implemented by the first detecting unit 131, and S32 may be implemented by the transmitting unit 132. That is, the first detecting unit 131 may be configured to detect whether a user is currently accessing a web service. If a user is accessing the web service, the transmitting unit 132 may be configured to transmit, via the synchronization server, the user operation information to the mobile terminal that accesses the web service.

It can be understood that if a user is accessing the web service, it means that the user is currently waiting for shared data of the electronic whiteboard 100. At this time, the current user operation information may be transmitted via the synchronization server to the mobile terminal that accesses the web service to make the mobile terminal update an image corresponding to the electronic whiteboard 100.

In some embodiments, S30 includes the following step.

In S33, a next user input is detected if no user is accessing the web service.

Specifically, the transmitting module 130 includes a second detecting unit 133, and S33 may be implemented by the second detecting unit 133. That is, the second detecting unit 133 may be configured to detect the next user input if no user is accessing the web service.

In this way, if no user is accessing the web service, it means that no user is currently waiting for the shared data of the electronic whiteboard 100, and there is no need to transmit the user operation information of the electronic whiteboard 100 at this time. Detecting the next user input may be that the electronic whiteboard 100 detects whether there is a new user input and whether the new user input is completed. If there is a new user input, after determining the corresponding user input is completed, it can be detected again whether a mobile terminal has accessed the web service of the electronic whiteboard 100 to determine whether to transmit the user operation information.

That is, each time after a new user input is received and completed, it can be detected once whether a user is accessing the web service so as to determine whether the corresponding user operation information needs to be transmitted.

In some embodiments, the data sharing method includes: transmitting all user operations and corresponding image data cached in history to the mobile terminal in the case that the mobile terminal accesses a web for the first time or the mobile terminal refreshes the web.

In this way, when accessing the web for the first time or refreshes the web, the mobile terminal may receive relevant information such as all the user operations and the corresponding image data historically cached by the electronic whiteboard 100 for initial rendering, so that all operations shared by the electronic whiteboard 100 may be known by the mobile terminal and complete shared contents of the electronic whiteboard 100 are acquired.

Figure 4:
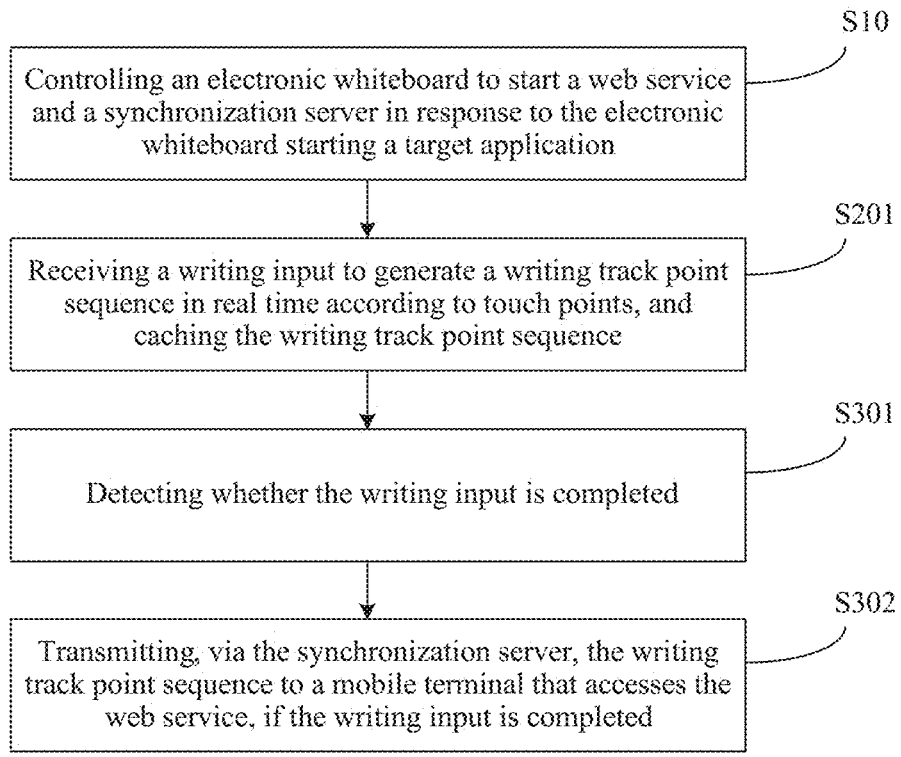
FIG. 4 is yet another schematic flow chart of a data sharing method according to some embodiments of the present disclosure.

Referring to FIG. 4, in some embodiments, the user input includes a writing input, and S20 includes the following step.

In S201, the writing input is received to generate a writing track point sequence in real time according to touch points, and the writing track point sequence is cached.

S30 includes the following steps.

In S301, whether the writing input is completed is detected.

In S302, if yes, the writing track point sequence is transmitted via the synchronization server to a mobile terminal that accesses the web service.

Specifically, S201 may be implemented by the processing module 120, and S301 and S302 may be implemented by the transmitting module 130. That is, the processing module 120 may be configured to receive the writing input to generate the writing track point sequence in real time according to touch points, and cache the writing track point sequence; and the transmitting module 130 may be configured to detect whether the writing input is completed and to transmit the writing track point sequence to the mobile terminal that accesses the web service via the synchronization server, in a case that the writing input is completed.

The electronic whiteboard 100 may have corresponding operation keys. The user may select the corresponding user operations by the operation keys. The operation keys may be physical keys or virtual keys displayed on the electronic whiteboard 100, which is not specifically limited herein.

When selecting the writing operation, the user may perform the writing input on a touch screen by means of finger touch or a corresponding input device (for example, a stylus). When the user is performing the writing operation, the electronic whiteboard 100 may generate a writing track point sequence according to a movement track of a finger or the input device relative to the electronic whiteboard 100. In a case that the user makes the writing input by the finger, the electronic whiteboard 100 may detect the user's finger once within an input range every preset time, and every time the user's finger is detected, the time and coordinates of the finger relative to a canvas may be recorded. It can be understood that the coordinates of the finger detected each time may determine one point on the canvas, and then coordinate locations of the movement track of the finger are recorded in chronological order to generate the writing track point sequence. In one example, the preset time may be 0.1 second. Of course, the preset time may also be set according to a writing response speed selected by the user, which is not specifically limited herein.

In some embodiments, the electronic whiteboard 100 may also render the writing track point sequence according to the writing operation, so that the electronic whiteboard 100 can display the writing track corresponding to the writing track point sequence.

In this way, the electronic whiteboard 100 may perform rendering according to the track point sequence to generate corresponding image data and then display the writing track on the electronic whiteboard 100.

In some embodiments, S301 includes:
detecting an input signal within preset time, and if no signal is input within the preset time, determining that the writing input is completed.

Specifically, the transmitting module 130 may be configured to detect the input signal within preset time. If no signal is input within the preset time, the writing input is completed. In this way, the user's input is automatically recognized, and a complete writing track is generated in real time, thereby reducing interference between different writing tracks.

In one example, the user may input by a finger, and whether a user's hand is raised is detected in real time during the user's writing operation. When the user's hand is raised and no signal is input within the preset time, it can be determined that the writing input currently performed by the user is completed, so that the generated writing track point sequence may be transmitted, via the synchronization server, to the mobile terminal that accesses the web service.

Figure 5:
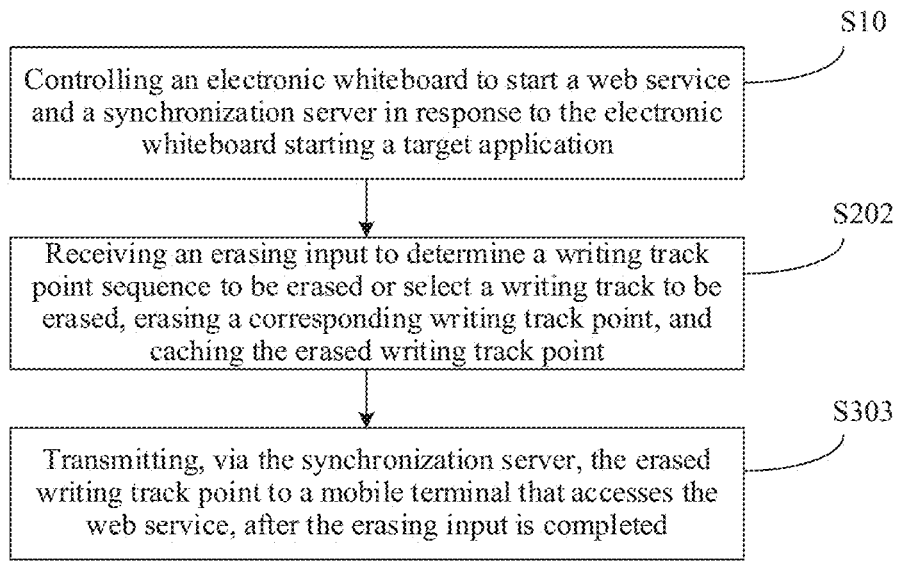
FIG. 5 is still yet another schematic flow chart of a data sharing method according to some embodiments of the present disclosure.

Referring to FIG. 5, in some embodiments, the user input includes an erasing input, and S20 includes the following step.

In S202, an erasing input is received to determine a track point sequence to be erased or select a writing track to be erased, erase a corresponding writing track point, and cache the erased writing track point.

S30 includes the following step.

In S302, after the erasing input is completed, the erased writing track point is transmitted via the synchronization server to a mobile terminal that accesses the web service.

Specifically, S202 may be implemented by the processing module 120, and S303 may be implemented by the transmitting module 130. That is, the processing module 120 may be configured to receive the erasing input to determine the writing trace point sequence to be erased or select the writing track to be erased, erase the corresponding writing track point, and cache the erased writing track point; and the transmitting module 130 may be configured to transmit, via the synchronization server, the erased writing track point to the mobile terminal that accesses the web service after the erasing input is completed, so that the mobile terminal may perform rendering according to the writing track point sequence, thereby updating a web rendering image corresponding to the writing track of the electronic whiteboard 100 on an application web of the mobile terminal.

It can be understood that when the user writes on the electronic whiteboard 100, there may be a writing error. At this time, the user may select the erasing operation by a corresponding operation key, so as to erase a writing track. After selecting the erasing operation, the user may select a writing track passing through a touch point by clicking the touch point, or select the writing track in the corresponding area by a marquee tool. Upon completion of the selection, the electronic whiteboard 100 may erase the selected writing track point.

In another example, the electronic whiteboard 100 may also perform the erasing operation by means of an "eraser". For example, the user may make an erasing input on the electronic whiteboard 100 in a way similar to writing to form an erasing track point sequence, so that the electronic whiteboard 100 may select a writing track point sequence which coincides with the erasing track point sequence as the writing track point to be erased. Upon completion of the selection, the electronic whiteboard 100 may erase the corresponding writing track point and cache the erased writing track point.

In other examples, the electronic whiteboard 100 may also erase the writing track by means of withdrawing. When selecting the corresponding key, the user may select the recently written track point sequence as the track point sequence to be erased. Upon completion of the selection, the electronic whiteboard 100 may erase the corresponding writing track point sequence and cache the erased writing track point. Of course, the withdrawal operation is not limited to erasing the writing track, may also be for the user to restore the erased writing track or may be other operations, which is not specifically limited herein.

Upon completion of the erasing operation, the electronic whiteboard 100 transmits, via the synchronization server, the erased writing track point to the mobile terminal that accesses the web service, so that the mobile terminal may perform rendering according to the erased writing track point, thereby updating a web rendering image corresponding to electronic whiteboard 100 from which the writing track point is erased on an application web of the mobile terminal.

In some embodiments, the electronic whiteboard 100 may also render the erased writing track point according to the erasing operation to display the web rendering image with the corresponding track point erased.

Figure 6:
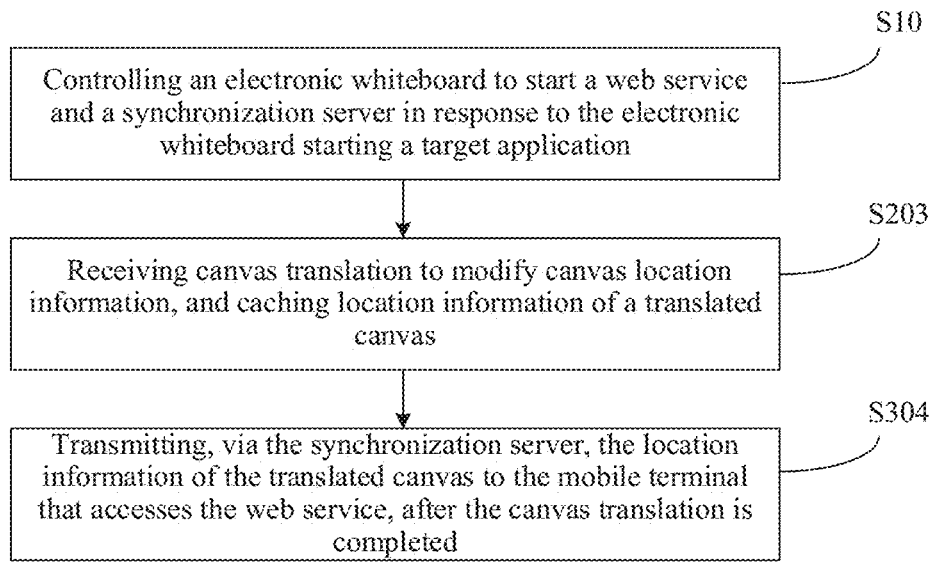
FIG. 6 is still yet another schematic flow chart of a data sharing method according to some embodiments of the present disclosure.

Referring to FIG. 6, in some embodiments, the user input includes canvas translation, and S20 includes the following step.

In S203, canvas translation is received to modify canvas location information and cache location information of a translated canvas.

S30 includes the following step.

In S304, the location information of the translated canvas is transmitted via the synchronization server to a mobile terminal that accesses the web service after the canvas translation is completed.

Specifically, S203 may be implemented by the processing module 120, and S304 may be implemented by the transmitting module 130. That is, the processing module 120 may be configured to receive the canvas translation to modify the canvas location information and cache the location information of a translated canvas; and the transmitting module 130 may be configured to transmit, via the synchronization server, the location information of the translated canvas to a mobile terminal that accesses the web service, after the canvas translation is completed.

In this way, the user can adjust the location of the current input by means of canvas translation, so that the user can well write or perform corresponding operations or explain the input content. The user can select the canvas translation operation by the corresponding operation key, and then the user can input a movement direction and a movement distance of the canvas. For example, in a case that the user operates with a stylus, the stylus may slide on the electronic whiteboard 100 for a certain distance, and the electronic whiteboard 100 may move the whole canvas in a sliding direction by a distance equal to the sliding distance of the stylus, with the starting position of the sliding of the stylus as a center. After the movement direction and the movement distance of the canvas are determined, the electronic whiteboard 100 caches the canvas location information which is modified after a movement.

In another example, after the user selects the canvas translation operation, the electronic whiteboard 100 may display a direction option and a distance option, and the user can select or input corresponding canvas movement parameters through the direction option and the distance option to determine the movement direction and the movement distance of the canvas. After the movement direction and the movement distance are determined, the electronic whiteboard 100 caches the canvas location information which is modified after a movement.

After the canvas translation is completed, the electronic whiteboard 100 transmits, via the synchronization server, the modified canvas location information to the mobile terminal that accesses the web service, so that the mobile terminal may perform rendering according to the modified canvas location information, thereby updating the web rendering image corresponding to a translated canvas of the electronic whiteboard 100 on the application web of the mobile terminal.

In some embodiments, the electronic whiteboard 100 may also render the location information of the translated canvas according to the canvas translation operation to display a picture of the translated canvas.

Figure 7:
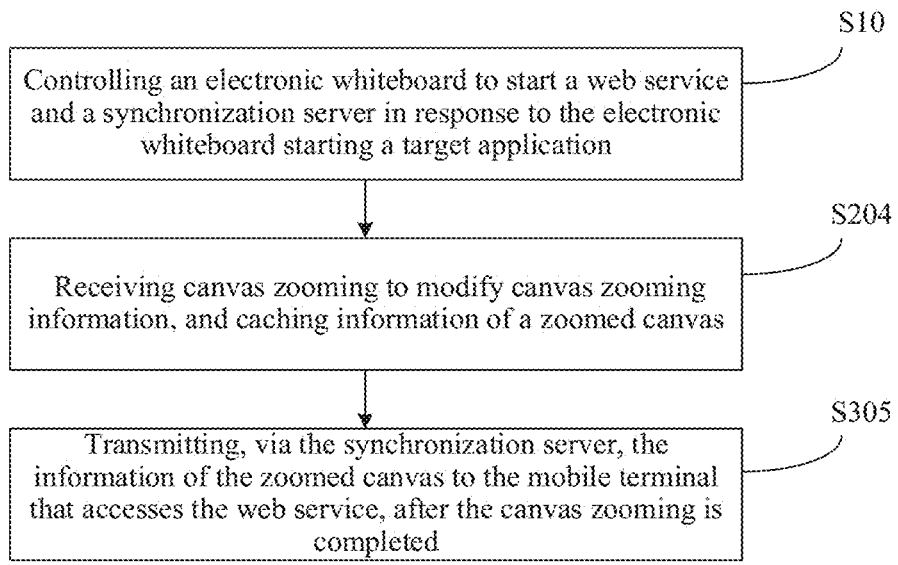
FIG. 7 is still yet another schematic flow chart of a data sharing method according to some embodiments of the present disclosure.

Referring to FIG. 7, in some embodiments, the user input includes canvas zooming, and S20 includes the following step.

In S204, canvas zooming is received to modify canvas zooming information and cache information of a zoomed canvas.

S30 includes the following step.

In S305, the information of the zoomed canvas is transmitted via the synchronization server to a mobile terminal that accesses the web service, after the canvas zooming is completed.

Specifically, S204 may be implemented by the processing module 120, and S305 may be implemented by the transmitting module 130. That is, the processing module 120 may be configured to receive the canvas zooming to modify the canvas zooming information and cache the information of the zoomed canvas; and the transmitting module 130 may be configured to transmit, via the synchronization server, the information of the zoomed canvas to a mobile terminal that accesses the web service, after the canvas zooming is completed.

It can be understood that the electronic whiteboard 100 may display different contents according to the size of the canvas. The user can adjust the size of the display canvas by zooming the canvas so as to choose to display different contents or change how much content is displayed.

Accordingly, the user can select the canvas zooming operation by the corresponding operation key. The canvas zooming information may be a zooming center, a zooming ratio, etc. Information of a zoomed canvas may be determined according to the canvas zooming information. The electronic whiteboard 100 may cache the information of the zoomed canvas.

In one example, when operating with a stylus, the user may choose to zoom in or out the canvas, and then control the stylus to slide on the electronic whiteboard 100 for a certain distance. The electronic whiteboard 100 may determine the zooming ratio according to the sliding distance of the stylus with the sliding start point of the stylus as a center.

After the canvas zooming is completed, the electronic whiteboard 100 transmits, via the synchronization server, information of a zoomed canvas to the mobile terminal that accesses the web service, so that the mobile terminal may perform rendering according to the information of the zoomed canvas, thereby updating the web rendering image corresponding to the zoomed canvas of the electronic whiteboard on the application web of the mobile terminal.

Figure 8:
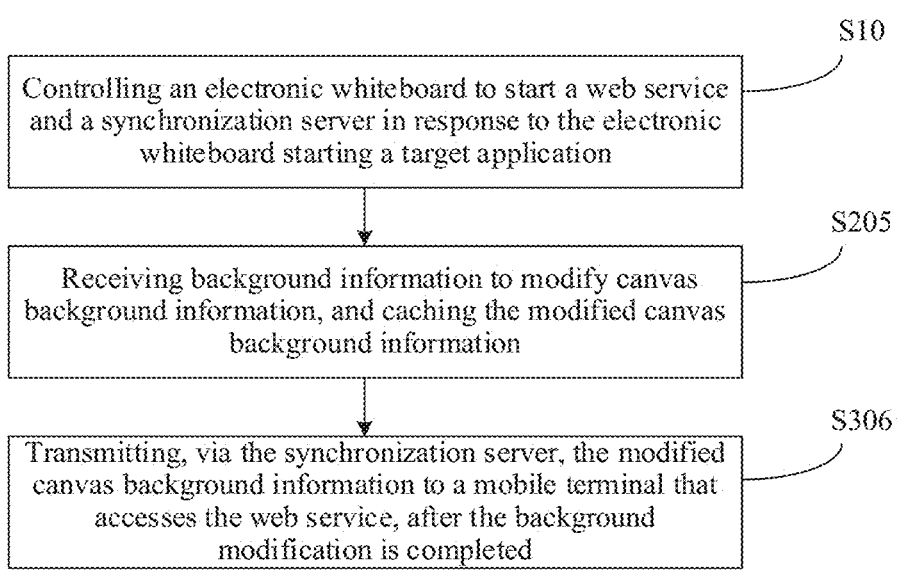
FIG. 8 is still yet another schematic flow chart of a data sharing method according to some embodiments of the present disclosure.

Referring to FIG. 8, in some embodiments, the user input includes background modification, and S20 includes the following step.

In S203, background modification is received to modify canvas background information and cache modified canvas background information.

S30 includes the following step.

In S306, the modified canvas background information is transmitted via the synchronization server to a mobile terminal that accesses the web service, after the background modification is completed.

Specifically, S205 may be implemented by the processing module 120, and S306 may be implemented by the transmitting module 130. That is, the processing module 120 may be configured to receive the background modification to modify the canvas background information and cache the modified canvas background information; and the transmitting module 130 may be configured to transmit, via the synchronization server, the modified canvas background information to a mobile terminal that accesses the web service, after the background modification is completed.

It can be understood that the display effect of writing on the electronic whiteboard 100 is different under different canvas backgrounds. In particular, the writing operation may also choose paint brushes of different colors for writing, and different visual effects may be achieved by matching up colors of writing tracks with the canvas background, so that the main contents of writing can be highlighted. The canvas background information may be background color, background pattern, background brightness and other information. After the modified canvas background information is determined, the electronic whiteboard 100 may cache the canvas background information of a modified background.

After the background modification is completed, the electronic whiteboard 100 transmits, via the synchronization server, the modified canvas background information to the mobile terminal that accesses the web service, so that the mobile terminal may perform rendering according to the modified canvas background information, thereby updating the web rendering image corresponding to the electronic whiteboard 100 with the canvas background modified on the application web of the mobile terminal.

In some embodiments, the electronic whiteboard 100 may also render the modified canvas background information according to the background modification operation to display a picture after background modification.

Figure 9:
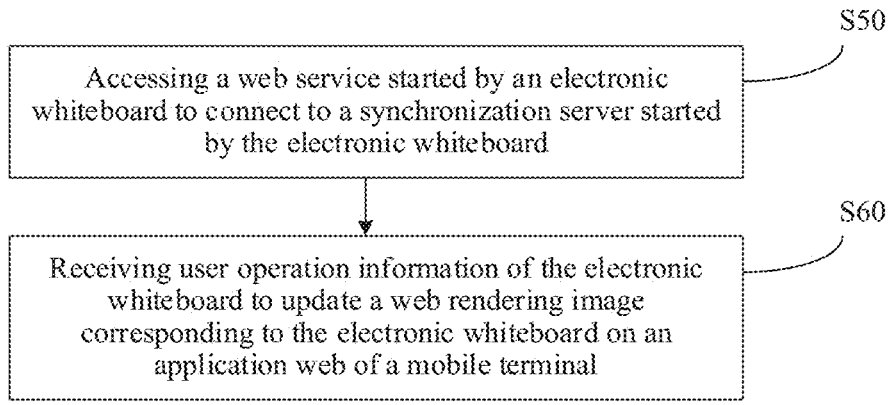
FIG. 9 is still yet another schematic flow chart of a data sharing method according to some embodiments of the present disclosure.
Figure 10:
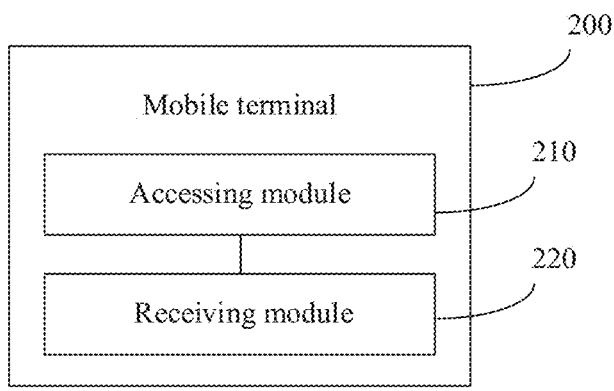
FIG. 10 is a schematic diagram of modules of a mobile terminal according to some embodiments of the present disclosure.
Figure 11:
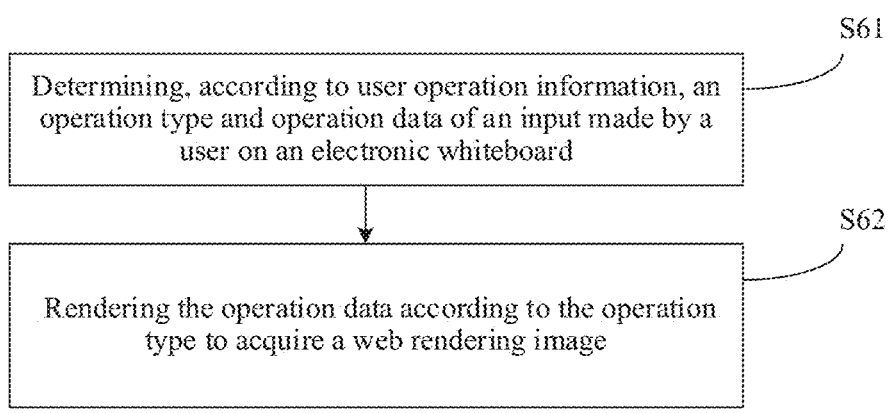
FIG. 11 is still yet another schematic flow chart of a data sharing method according to some embodiments of the present disclosure.

Referring to FIGS. 9 and 10, according to some embodiments of the present disclosure, a data sharing method is further provided. The data sharing method is used for a mobile terminal, so that the mobile terminal can achieve data sharing with the electronic whiteboard 100. The mobile terminal 200 accesses the web service of the electronic whiteboard 100 to acquire data and operations shared by the electronic whiteboard 100.

In some embodiments, the data sharing method includes the following steps.

In S50, a web service started by the electronic whiteboard 100 is accessed to connect to a synchronization server started by the electronic whiteboard.

In step S60, user operation information of the electronic whiteboard 110 is received to update a web rendering image corresponding to the electronic whiteboard 100 on an application web of the mobile terminal 200.

Specifically, the mobile terminal 200 includes an accessing module 210 and a receiving module 220. S50 may be implemented by the accessing module 210, and S60 may be implemented by the receiving module 220. That is, the accessing module 210 may be configured to access the web service started by the electronic whiteboard 100 to connect to the synchronization server started by the electronic whiteboard 100, and the receiving module 220 may be configured to receive the user operation information of the electronic whiteboard 100 to update the web rendering image corresponding to the electronic whiteboard 100 on the application web of the mobile terminal 200.

In the data sharing method and the mobile terminal 200 according to the embodiments of the present disclosure, the track effect shared by the electronic whiteboard 100 is displayed on a web, which is simple in use. In addition, an additional electronic whiteboard 100 or client is not required, so that the ease of deployment and demonstration is improved. The mobile terminal 200 may access the web service started by the electronic whiteboard 100 by means of web browsing via a local area network or the Internet, which is not specifically limited herein.

In some embodiments, the mobile terminal accesses the web service via an address of the web service and/or via an identification code generated according to the address of the web service.

The address of the web service acquired by the mobile terminal may be displayed on the electronic whiteboard 100 and manually input by the user, or may be an address acquired from a network connected to the electronic whiteboard 100. The identification code generated by the electronic whiteboard 100 according to the address of the web service may be acquired by the mobile terminal that scans the identification code displayed on the electronic whiteboard 100.

In one example, the mobile terminal 200 may scan the identification code displayed on the electronic whiteboard 100, and open a web via a browser to access the web service of the electronic whiteboard 100. Then, user operation information of the electronic whiteboard 200 is received and rendering is performed according to the user operation information, so that a web rendering image corresponding to the electronic whiteboard 100 is updated on the application web of the mobile terminal 200.

In some embodiments, S60 includes the following steps.

In S61, an operation type and operation data of an input made by a user on the electronic whiteboard 100 are determined according to the user operation information.

In S62, the operation data is rendered according to the operation type to acquire a web rendering image.

Specifically, S61 and S62 may be implemented by the receiving module 220. That is, the receiving module 220 may be configured to determine the operation type and the operation data of the input made by the user on the electronic whiteboard 100 according to the user operation information, and render the operation data according to the operation type to acquire the web rendering image.

In this way, for different types of operations made by the user on the electronic whiteboard 100, the mobile terminal 200 first determines the type of operation made by the user according to the user operation information, and then renders the operation data using a corresponding processing method according to the type of operation to acquire the web rendering image.

In some embodiments, S60 includes: in response to starting or refreshing a web, acquiring all user operation and image data of the electronic whiteboard 100 cached in history from the synchronization server, and performing initial rendering according to the received user operation and/or image data.

Specifically, the receiving module 220 may be configured to acquire all the user operation information of the electronic whiteboard 100 cached in history from the synchronization server in response to starting or refreshing the web, and to perform initial rendering according to the user operation information.

That is, when accessing the web for the first time or refreshing the web, the mobile terminal 200 may receive all the user operation information of the electronic whiteboard 100 cached in history for initial rendering, so that all operations shared by the electronic whiteboard 100 may be known by means of the mobile terminal 200.

In one example, the initial rendering may be performed according to the latest user operation information received on the electronic whiteboard 100, so that the mobile terminal 200 may synchronously display the latest content on the electronic whiteboard 100. The user operation information cached in history may be received as review data for the user to view again afterwards.

In some embodiments, S60 includes: receiving writing track sequence points of the electronic whiteboard 100 and generating a writing track on an application web of the mobile terminal 200 to update a web rendering image corresponding to the writing track of the electronic whiteboard 100.

Specifically, the receiving module 220 may be configured to receive writing track sequence points of the electronic whiteboard 100 and generate a writing track on an application web of the mobile terminal 200 to update a web rendering image corresponding to the writing track of the electronic whiteboard 100.

In this way, the mobile terminal 200 may perform rendering according to the received writing track sequence points of the electronic whiteboard 100 to acquire a writing track corresponding to the electronic whiteboard 100, so that data sharing between the electronic whiteboard 100 and the mobile terminal 200 may be realized.

In some embodiments, S60 includes: receiving track points erased by the electronic whiteboard 100 and erasing corresponding track points on the application web of the mobile terminal 200 to update the web rendering image corresponding to the electronic whiteboard 100 from which corresponding track points are erased.

Specifically, the receiving module 220 may be configured to receive track points erased by the electronic whiteboard 100 and erase corresponding track points on an application web of the mobile terminal 200 to update a web rendering image corresponding to the electronic whiteboard 100 from which the corresponding track points are erased.

Correspondingly, the mobile terminal 200 may perform rendering according to the received writing track points erased by the electronic whiteboard 100 to acquire an image corresponding to the electronic whiteboard 100 from which the writing track sequence points are erased, so that data sharing between the electronic whiteboard 100 and the mobile terminal 200 may be realized.

In some embodiments, S60 includes: receiving information of a translated canvas of the electronic whiteboard 100 and modifying canvas location information on the application web of the mobile terminal 200 to update a web rendering image corresponding to the translated canvas of the electronic whiteboard 100.

Specifically, the receiving module 220 may be configured to receive translated canvas information of the electronic whiteboard 100 and modify canvas location information on an application web of the mobile terminal 200 to update a web rendering image corresponding to the translated canvas of the electronic whiteboard 100.

Correspondingly, the mobile terminal 200 may perform rendering according to the received modified canvas location information of the electronic whiteboard 100 to acquire an image corresponding to the translated canvas of the electronic whiteboard 100, so that data sharing between the electronic whiteboard 100 and the mobile terminal 200 may be realized.

In some embodiments, S60 includes: receiving information of a zoomed canvas of the electronic whiteboard 100 and modifying canvas zooming information on an application web of the mobile terminal 200 to update a web rendering image corresponding to the zoomed canvas of the electronic whiteboard 100.

Specifically, the receiving module 220 may be configured to receive information of the zoomed canvas of the electronic whiteboard 100 and modify canvas zooming information on an application web of the mobile terminal 200 to update a web rendering image corresponding to the zoomed canvas of the electronic whiteboard 100.

Correspondingly, the mobile terminal 200 may perform rendering according to the received information of the zoomed canvas of the electronic whiteboard 100 to acquire an image corresponding to the zoomed canvas of the electronic whiteboard 100, so that data sharing between the electronic whiteboard 100 and the mobile terminal 200 may be realized.

In some embodiments, S60 includes: receiving modified canvas background information of the electronic whiteboard 100 and modifying canvas background information on an application web of the mobile terminal 200 to update a web rendering image corresponding to the electronic whiteboard 100 with the canvas background modified.

Specifically, the receiving module 220 may be configured to receive modified canvas background information of the electronic whiteboard 100 and modify the canvas background information on an application web of the mobile terminal 200 to update a web rendering image corresponding to the electronic whiteboard 100 with the canvas background modified.

Correspondingly, the mobile terminal 200 may perform rendering according to the received modified canvas background information of the electronic whiteboard 100 to acquire an image corresponding to the electronic whiteboard 100 with the canvas background modified, so that data sharing between the electronic whiteboard 100 and the mobile terminal 200 may be realized.

Figure 12:
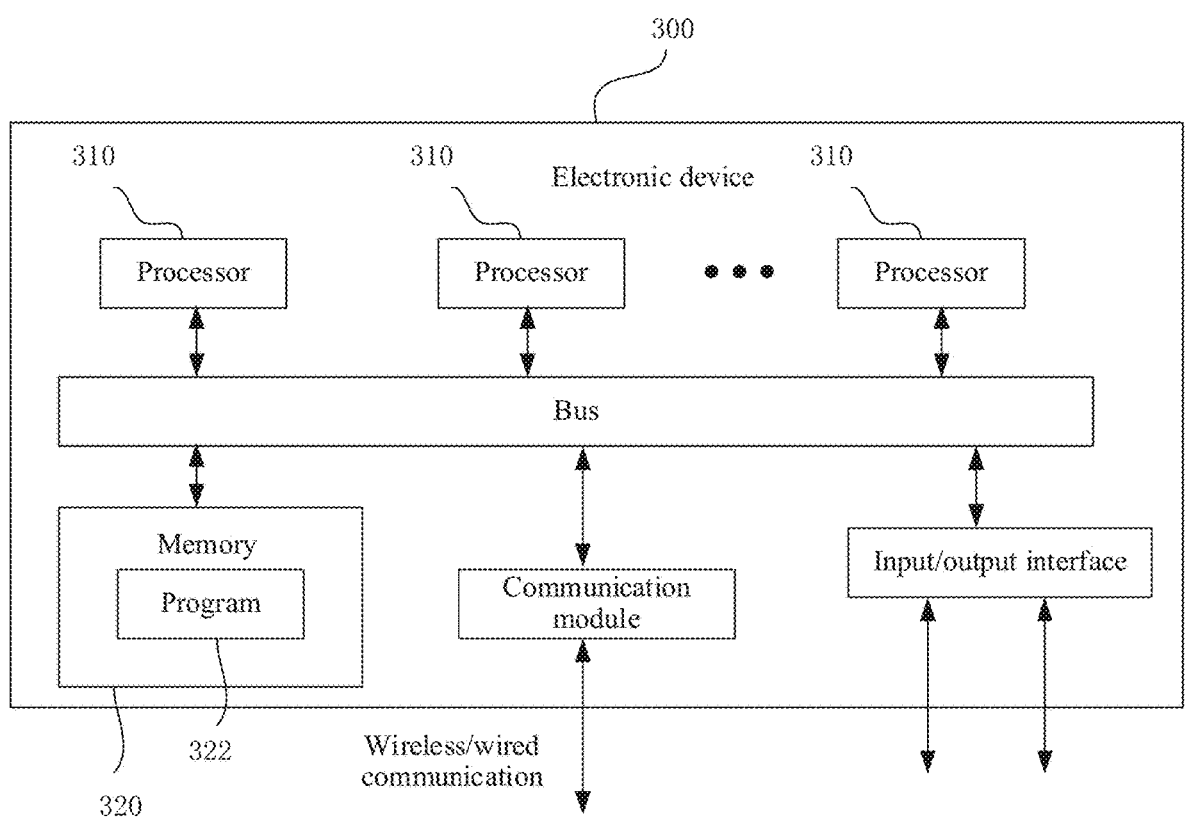
FIG. 12 is a schematic diagram of modules of an electronic device according to some embodiments of the present disclosure.

Referring to FIG. 12, according to some embodiments of the present disclosure, a computer device is further provided. The computer device includes a processor 310 and a memory 320, wherein the memory 320 stores a computer program 322; and the computer program 322, when executed by the processor 310, causes the processor 310 to implement the data sharing method according to any one of the above embodiments.

In one example, the computer program 322, when executed by the processor 310, implements the following steps.

In S10, the electronic whiteboard 100 is controlled to start a web service and a synchronization server in response to the electronic whiteboard 100 starting a target application.

In S20, a user input is received to determine a user operation and user operation information is cached.

In S30, the user operation information is transmitted via the synchronization server to a mobile terminal 200 that accesses the web service.

According to the embodiments of the present disclosure, an electronic device 300 implements the computer program 322 by the processor 310, and locally starts a web service and a synchronization server and synchronously transmits the track to all the connected mobile terminals. The function of data sharing can be achieved without using an external server, so that the practicability of the whiteboard is improved. Moreover, the track effect is shared and displayed via a web, so that the use is simple. The convenience of deployment and demonstration is improved since neither an additional electronic whiteboard nor a client is required.

According to some embodiments of the present disclosure, a storage medium is further provided. The storage medium stores a computer program, wherein the computer program, when executed by one or more processors, causes the processor(s) to implement the data sharing method according to any one of the above embodiments.

In the descriptions of the present disclosure, the descriptions of referring terms such as "an embodiment", "some embodiments", "exemplary embodiments", "examples", "specific examples" or "some examples" means specific features, structures, materials or characteristics described in combination with the embodiment or example are included in at least one embodiment or example of the present disclosure. In the description, the schematic representation of the terms does not necessarily refer to the same embodiment or example. Furthermore, the described particular features, structures, materials, or characteristics may be combined in any suitable manner in any one or more embodiments or examples.

It should be understood by those skilled in the art to which the embodiments of the present disclosure belong: any description of a process or method described in the flow chart or otherwise herein may be understood to represent a module, segment or part of a code comprising one or more executable instructions for implementing steps of the defined logic function or process, and the scopes of the preferred embodiments of the present disclosure include other implementations in which functions can be performed out of the order shown or discussed, including in a substantially simultaneous manner or in a reverse order according to the functions involved.

It will be appreciated by those of ordinary skill in the art that all or part of the steps carried by the method for implementing the above-described embodiments may be performed through relevant hardware instructed by a program. The program may be stored in a computer-readable storage medium. The program, when executed, include one or a combination of the steps of the method embodiments.

In addition, all functional units in respective embodiments of the present disclosure may be integrated into one processing unit. Or, each unit exists physically independently. Or, two or more units may be integrated into one unit. The above integrated units may be implemented in the form of hardware or a software functional unit. The integrated units, if implemented in the form of the software functional unit and sold or used as a standalone product, may be stored in a computer-readable storage medium. The storage medium mentioned above may be a read-only memory, a magnetic disk or an optical disk.

Although the embodiments of the present disclosure are illustrated and described as above, it can be understood that these embodiments are exemplary and cannot be construed as limitations to the present disclosure. Those of ordinary skills in the art can make possible changes, modifications, substitutions and variations to the embodiments described as above within the scope of the present disclosure.

The invention claimed is:

1. A data sharing method, used for an electronic whiteboard and comprising:
controlling the electronic whiteboard to start a web service and a synchronization server in response to the electronic whiteboard starting a target application;
receiving a user input to determine a user operation, and caching user operation information; and
transmitting, via the synchronization server, the user operation information to a mobile terminal that accesses the web service,
wherein the transmitting, via the synchronization server, the user operation information to the mobile terminal that accesses the web service comprises:
detecting whether a user is currently accessing the web service; and
transmitting, via the synchronization server, the user operation information to a mobile terminal that accesses the web service, if a user is accessing the web service.

2. The data sharing method according to claim 1, comprising:
controlling the electronic whiteboard to display an address of the web service and/or display an identification code generated according to the address of the web service, so that the mobile terminal accesses the web service via the address of the web service and/or the identification code generated according to the address of the web service.

3. The data sharing method according to claim 1, wherein the user input comprises a writing input, and receiving the user input to determine the user operation, and caching the user operation information comprises:
receiving the writing input to generate a writing track point sequence in real time according to touch points, and caching the writing track point sequence; and
transmitting, via the synchronization server, the user operation information to the mobile terminal that accesses the web service comprises:
detecting whether the writing input is completed; and
transmitting, via the synchronization server, the writing track point sequence to the mobile terminal that accesses the web service, if the writing input is completed.

4. The data sharing method according to claim 3, wherein detecting whether the writing input is completed comprises:
detecting an input signal within preset time, and determining that the writing input is completed if no signal is input within the preset time.

5. The data sharing method according to claim 1, wherein the user input comprises an erasing input, and receiving the user input to determine the user operation, and caching the user operation information comprises:
receiving the erasing input to determine the writing track point sequence to be erased or select a writing track to be erased, erasing a corresponding writing track point, and caching an erased writing track point; and
transmitting, via the synchronization server, the user operation information to the mobile terminal that accesses the web service comprises:
transmitting, via the synchronization server, the erased writing track point to a mobile terminal that accesses the web service, after the erasing input is completed.

6. The data sharing method according to claim 1, wherein the user input comprises canvas translation, and receiving the user input to determine the user operation, and caching the user operation information comprises:
receiving the canvas translation to modify canvas location information, and caching location information of a translated canvas; and transmitting, via the synchronization server, the user operation information to the mobile terminal that accesses the web service comprises:
  transmitting, via the synchronization server, the location information of the translated canvas to the mobile terminal that accesses the web service, after the canvas translation is completed.

7. The data sharing method according to claim 1, wherein the user input comprises canvas zooming, and receiving the user input to determine the user operation, and caching the user operation information comprises:
  receiving the canvas zooming to modify canvas zooming information, and caching information of a zoomed canvas; and
  transmitting, via the synchronization server, the user operation information to the mobile terminal that accesses the web service comprises:
  transmitting, via the synchronization server, the information of the zoomed canvas to the mobile terminal that accesses the web service, after the canvas zooming is completed.

8. The data sharing method according to claim 1, wherein the user input comprises background modification, and receiving the user input to determine the user operation, and caching the user operation information comprises:
  receiving the background modification to modify canvas background information, and caching modified canvas background information; and
  transmitting, via the synchronization server, the user operation information to the mobile terminal that accesses the web service comprises:
  transmitting, via the synchronization server, the modified canvas background information to a mobile terminal that accesses the web service, after the background modification is completed.

9. The data sharing and synchronizing method according to claim 1, wherein the web service is an HTTP web service, and the synchronization server is a local synchronization server of the electronic whiteboard.

10. A computer device, comprising a processor and a memory, wherein the memory stores a computer program, and the computer program, when executed by the processor, causes the processor to implement the data sharing method according to claim 1.

11. A data sharing method, used for a mobile terminal and comprising:
  accessing a web service started by an electronic whiteboard to connect to a synchronization server started by the electronic whiteboard; and
  receiving user operation information of the electronic whiteboard to update a web rendering image corresponding to the electronic whiteboard on an application web of the mobile terminal,
  wherein the receiving the user operation information of the electronic whiteboard to update the web rendering image corresponding to the electronic whiteboard on the application web of the mobile terminal comprises:
  acquiring all user operation information data of the electronic whiteboard cached in history from the synchronization server, and performing initial rendering according to the user operation information, in response to starting or refreshing the web.

12. The data sharing method according to claim 11, wherein the mobile terminal accesses the web service via an address of the web service and/or via an identification code generated according to the address of the web service.

13. The data sharing method according to claim 11, wherein receiving the user operation information of the electronic whiteboard to update the web rendering image corresponding to the electronic whiteboard on the application web of the mobile terminal comprises:
  determining, according to the user operation information, an operation type and operation data of an input made by a user on the electronic whiteboard; and
  rendering the operation data according to the operation type to acquire the web rendering image.

14. The data sharing method according to claim 11, wherein receiving the user operation information of the electronic whiteboard to update the web rendering image corresponding to the electronic whiteboard on the application web of the mobile terminal comprises:
  receiving writing track sequence points of the electronic whiteboard and generating a writing track on the application web of the mobile terminal to update a web rendering image corresponding to the writing track of the electronic whiteboard.

15. The data sharing method according to claim 11, wherein receiving the user operation information of the electronic whiteboard to update the web rendering image corresponding to the electronic whiteboard on the application web of the mobile terminal comprises:
  receiving track points erased by the electronic whiteboard and erasing corresponding track points on the application web of the mobile terminal to update the web rendering image corresponding to the electronic whiteboard from which the corresponding track points are erased.

16. The data sharing method according to claim 11, wherein receiving the user operation information of the electronic whiteboard to update the web rendering image corresponding to the electronic whiteboard on the application web of the mobile terminal comprises:
  receiving information of a translated canvas of the electronic whiteboard and modifying canvas location information on the application web of the mobile terminal to update a web rendering image corresponding to the translated canvas of the electronic whiteboard.

17. The data sharing method according to claim 11, wherein receiving the user operation information of the electronic whiteboard to update the web rendering image corresponding to the electronic whiteboard on the application web of the mobile terminal comprises:
  receiving information of a zoomed canvas of the electronic whiteboard and modifying canvas zooming information on the application web of the mobile terminal to update a web rendering image corresponding to the zoomed canvas of the electronic whiteboard.

18. The data sharing method according to claim 11, wherein receiving the user operation information of the electronic whiteboard to update the web rendering image corresponding to the electronic whiteboard on the application web of the mobile terminal comprises:
  receiving modified canvas background information of the electronic whiteboard and modifying canvas background information on the application web of the mobile terminal to update a web rendering image corresponding to the electronic whiteboard after background modification.

* * * * *